(12) United States Patent
Espinoza

(10) Patent No.: US 10,544,678 B2
(45) Date of Patent: Jan. 28, 2020

(54) GAS TURBINE ENGINE ROTOR DISK BALANCING

(71) Applicant: United Technologies Corporation, Hartford, CT (US)

(72) Inventor: Michael Espinoza, Middletown, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 853 days.

(21) Appl. No.: 14/613,404

(22) Filed: Feb. 4, 2015

(65) Prior Publication Data

US 2016/0222784 A1 Aug. 4, 2016

(51) Int. Cl.
*F01D 5/02* (2006.01)
*B23C 3/00* (2006.01)

(52) U.S. Cl.
CPC ............... *F01D 5/027* (2013.01); *B23C 3/00* (2013.01); *B23C 2215/52* (2013.01); *F05D 2220/32* (2013.01); *F05D 2230/10* (2013.01); *F05D 2240/24* (2013.01); *F05D 2260/15* (2013.01)

(58) Field of Classification Search
USPC .......................................................... 416/144
See application file for complete search history.

(56) References Cited

U.S. PATENT DOCUMENTS

| 4,926,710 | A | 5/1990 | Novotny | |
|---|---|---|---|---|
| 6,354,780 | B1 * | 3/2002 | Davis | F01D 5/027 414/146 |
| 7,793,540 | B2 * | 9/2010 | Robbins | G01M 1/16 73/459 |
| 7,912,587 | B2 | 3/2011 | Walters et al. | |
| 8,186,954 | B2 | 5/2012 | Lee et al. | |
| 8,287,242 | B2 * | 10/2012 | Bifulco | F01D 5/066 415/216.1 |
| 8,459,943 | B2 * | 6/2013 | Schutte | F01D 5/066 415/199.4 |
| 9,127,556 | B2 * | 9/2015 | Pronovost | F01D 5/027 |
| 2010/0080705 | A1 | 4/2010 | Pronovost et al. | |
| 2013/0086805 | A1 * | 4/2013 | Pronovost | F01D 5/027 29/889.23 |
| 2013/0209260 | A1 | 8/2013 | Stone | |
| 2013/0340521 | A1 * | 12/2013 | Clark | F01D 5/027 73/462 |
| 2014/0140849 | A1 | 5/2014 | Muscat et al. | |

FOREIGN PATENT DOCUMENTS

| EP | 1862698 A2 | 5/2007 |
|---|---|---|
| EP | 2677119 A2 | 12/2013 |
| JP | S5915602 A | 1/1984 |
| WO | 2014152414 | 9/2014 |

OTHER PUBLICATIONS

Extended European Search Report for European Application No. 16154311.1, dated Jun. 20, 2016.

* cited by examiner

*Primary Examiner* — Umashankar Venkatesan

(74) *Attorney, Agent, or Firm* — Carlson, Gaskey & Olds, P.C.

(57) ABSTRACT

A gas turbine engine rotor disk includes a web that extends inward in a radial direction from a rim to a bore that circumscribes an axis. An annular ridge extends axially from the side of the web. A balancing cut is in the annular ridge that includes a fillet that extends in the radial direction.

3 Claims, 3 Drawing Sheets

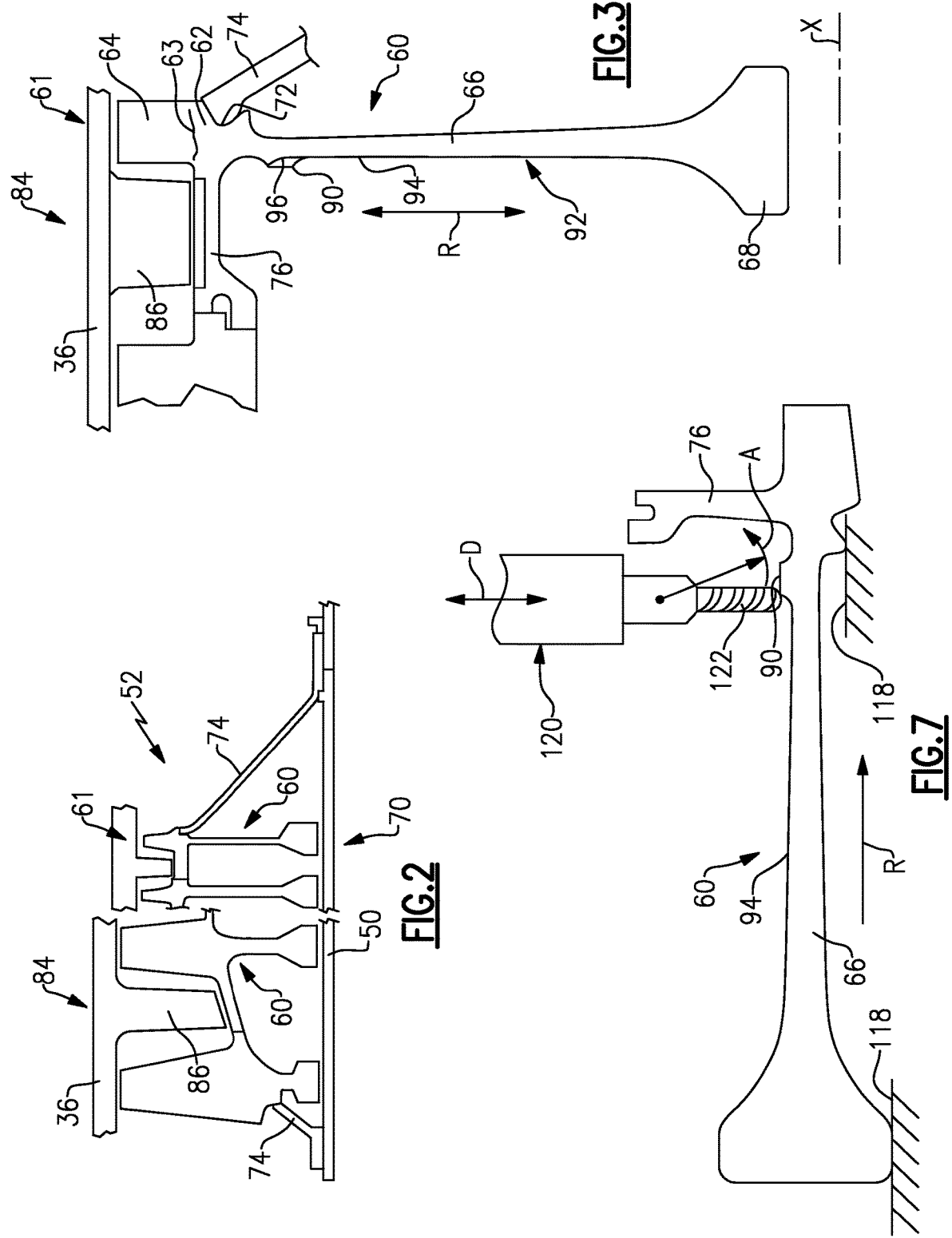

GAS TURBINE ENGINE ROTOR DISK BALANCING

BACKGROUND

This disclosure relates to balancing a rotor disk, for example, an integrally bladed rotor for a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of compressor section includes a stack of rotor disks. Some of these disks may include integrally bladed rotors (IBR) that are integrally formed with a rim of the disk. The blade and rim create centrifugal loads on the integral bore and radially extending web of the disk, which affect the life of the rotor disk.

A rotor disk may include an annular ridge on one side of the web that is used to balance the rotor disk. To balance the IBR, an imbalance of the rotor disk is determined, and a cut is machined into the annular ridge to rotationally balance the rotor disk. The cutting tool rotational axis is oriented generally parallel to the web radial direction. A straight cut is machined in a radial direction, which results in a cut having a flat and opposing lateral fillet.

SUMMARY

In one exemplary embodiment, a gas turbine engine rotor disk includes a web that extends inward in a radial direction from a rim to a bore that circumscribes an axis. An annular ridge extends axially from the side of the web. A balancing cut is in the annular ridge that includes a fillet that extends in the radial direction.

In a further embodiment of the above, a circumferential array of blades is supported on the web opposite the bore.

In a further embodiment of any of the above, the blades, web and bore are integrally formed with one another to provide a unitary, one-piece structure.

In a further embodiment of any of the above, a spacer extends in an axial direction from the web near the blades. The spacer is integrally formed with the web.

In a further embodiment of any of the above, the side is a forward side.

In a further embodiment of any of the above, the web includes an aft side opposite the forward side. The aft side includes an annular groove that is configured to cooperate with a hub that clamps the rotor disk in a multi-disc compressor stack.

In a further embodiment of any of the above, the annular ridge circumscribes the axis substantially 360°.

In a further embodiment of any of the above, the balancing cut has spaced apart lateral fillets provided in a circumferential direction.

In a further embodiment of any of the above, the side has a generally planar surface. The fillet is in the radial direction and has spaced apart first and second axial heights relative to the generally planar surface at radial extremities of the balancing cut. The second axial height is arranged at a greater axial distance from the axis than the first axial height, the second axial height greater than the first axial height.

In a further embodiment of any of the above, the fillet has a radius of at least ten times the first axial height.

In a further embodiment of any of the above, the radius is between fifteen and thirty times the first axial height.

In another exemplary embodiment, a method of balancing a gas turbine engine rotor disk. The method comprising the steps of determining an imbalance of a rotor disk that has a web circumscribing an axis and extends in a radial direction. An area of an annular ridge on a side of the web is identified for material removal to balance the rotor disk. The rotor disk is supported in a fixture. A cut in machined in the annular ridge that includes a fillet in the radial direction. The cut balances the rotor disk about the axis.

In a further embodiment of any of the above, a circumferential array of blades is supported on the web opposite a bore. The blades, web and bore are integrally formed with one another to provide a unitary, one-piece structure.

In a further embodiment of any of the above, a spacer extends in an axial direction from the web near the blades. The spacer is integrally formed with the web.

In a further embodiment of any of the above, the machining step includes articulating a cutting tool along an arcuate path toward the spacer to provide the fillet in the radial direction.

In a further embodiment of any of the above, the cutting tool is a ball-nosed end mill.

In a further embodiment of any of the above, the balancing cut has spaced apart lateral fillets provided in a circumferential direction.

In a further embodiment of any of the above, the annular ridge circumscribes the axis substantially 360°.

In a further embodiment of any of the above, the side has a generally planar surface. The fillet in the radial direction has spaced apart first and second axial heights relative to the generally planar surface at radial extremities of the balancing cut. The second axial height is arranged at a greater axial distance from the axis than the first axial height. The second axial height is greater than the first axial height.

In a further embodiment of any of the above, the radius is between fifteen and thirty times the first axial height.

BRIEF DESCRIPTION OF THE DRAWINGS

The disclosure can be further understood by reference to the following detailed description when considered in connection with the accompanying drawings wherein:

FIG. 2 is a broken cross-sectional view of a compressor section stack of the engine in FIG. 1.

FIG. 3 is an enlarged cross-sectional view of a rotor disk embodiment from the stack of FIG. 2.

FIG. 7 is a schematic of a step of machining the balancing cut into the annular ridge.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
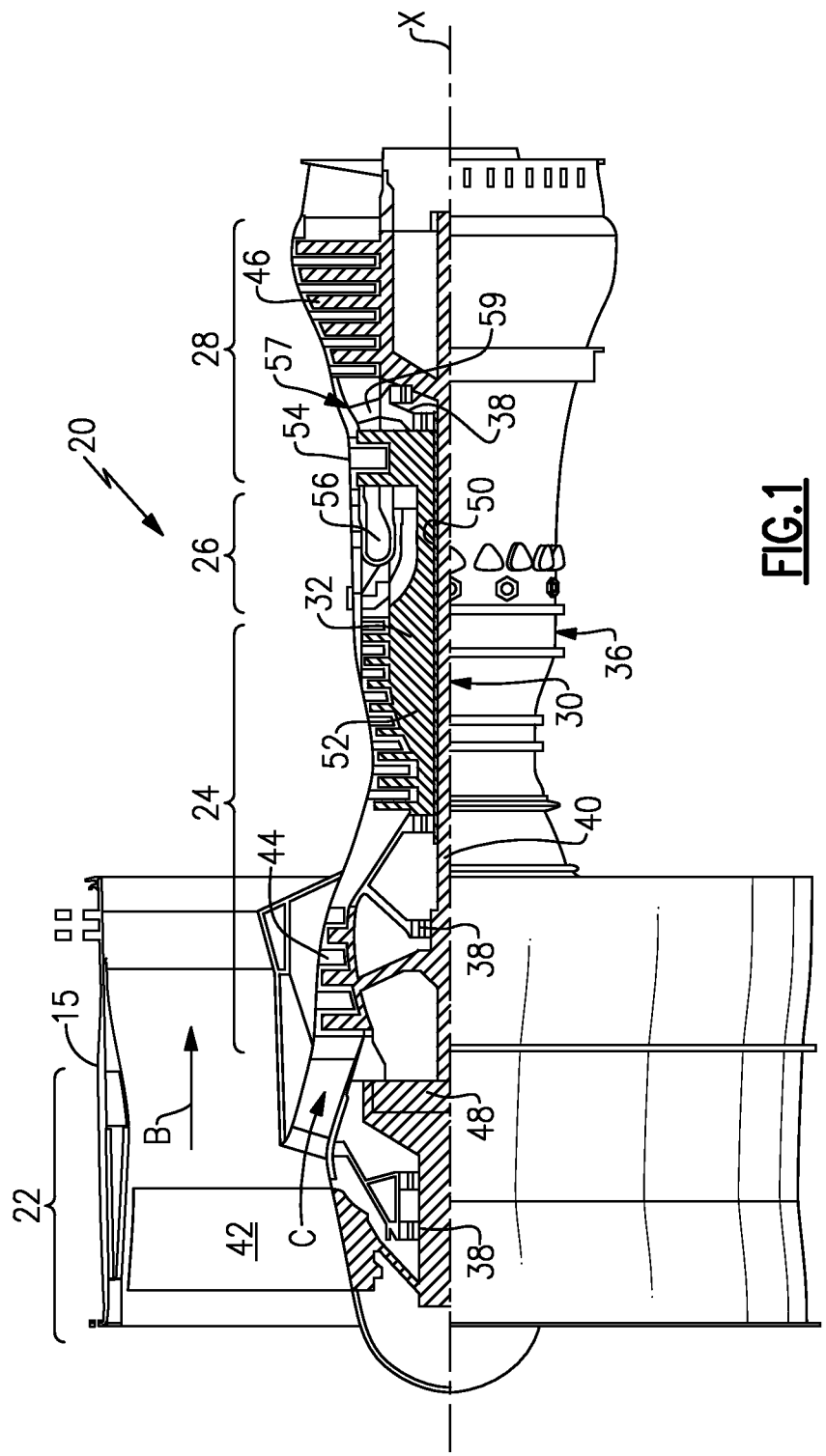
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct at least partially defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Referring to FIG. 2, an example high pressure compressor 52 is shown in more detail. The high pressure compressor 52 is provided by a stack 70 of rotor disks 60 mounted to the outer shaft 50. The rotor disks 60 are clamped between hubs 74. Fixed stages 84 are supported by the engine static structure 36 and arranged between rotating stages 61 provided by the rotor disks 60. The disclosed rotor disk embodiment may also be used in a low pressure compressor or in the turbine section.

Referring to FIG. 3, at least one rotor disk 60 includes a rim 62 integral with a web 66 extending radially inward to a bore 68. The rim 62 provides an end wall 63 from which integral blades 64 extend. The integrally bladed rotor disk is machined from a solid forging of titanium or nickel alloy, for example.

An annular groove 72 is provided at an aft side of the rim 62. The hub 74 engages the groove 72 to clamp the stack. In the example, the rotor disk 60 provides the last stage of the high pressure compressor 52. It should be understood that the rotor disk 60 may be provided at other locations within the stack 70.

A spacer 76 is integral with the rim 62 and extends axially from a side opposite the annular groove 72. The spacer 76 provides a flow path surface 78 that seals relative to a tip of vanes 86 of the fixed stage 84.

The web 66 extends inward in a radial direction R to the bore 68, which circumscribes the axis X. An annular ridge 90 extends axially from a forward side 92 of the web 66. The annular ridge may also be provided on the aft side of the web 66. The annular ridge 90 is proud of a generally planar surface 94 of the web 66. The annular ridge 90 circumscribes the axis substantially 360° in one embodiment.

Figure 4:
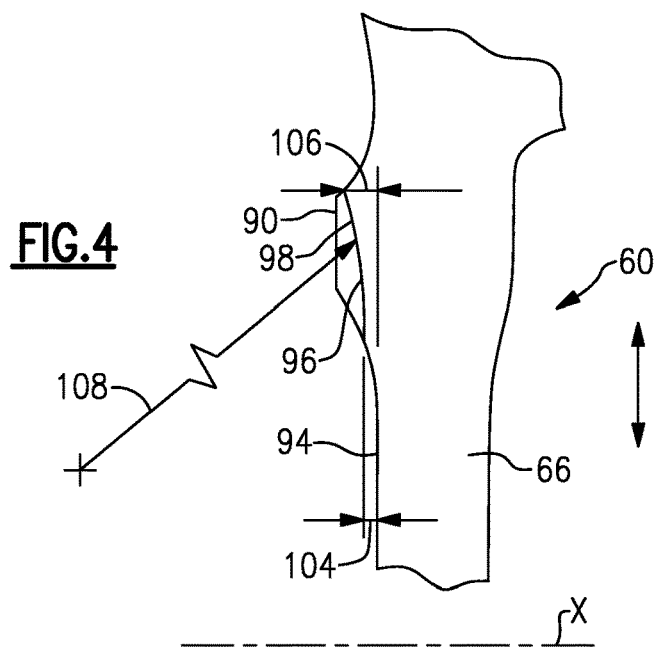
FIG. 4 is an enlarged cross-sectional view illustrating an annular ridge in a web of the rotor disk shown in FIG. 3.
Figure 5:
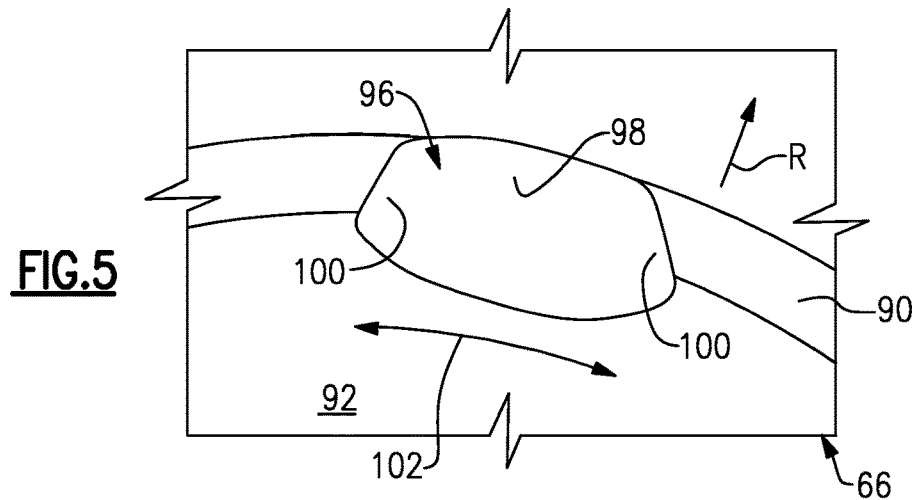
FIG. 5 is a perspective view of a balancing cut in the annular disk.

A balancing cut 96 is machined into the annular ridge 90 to restore a rotational balance of the rotor disk 60. The balancing cut 90 includes a fillet 98 in the radial direction R, best shown in FIGS. 4 and 5. The balancing cut 96 has spaced apart lateral fillets 100 in the circumferential direction 102 which are not parallel in the example, however, the fillet 100 may be arranged parallel to one another in other applications.

The fillet 98 has first and second spaced apart axial heights 104, 106 relative to the surface 94 at radial extremities of the balancing cut 98. The second axial height 106 is arranged at a greater axial distance from the axis X than the first axial height 104. The second axial height 106 is greater than the first axial height 104. In one example, the fillet 98 has a radius 108 that at least 10 times the first axial height 104. In another embodiment, the radius 108 is between 15 and 30 times the first axial height 104. In other words, the arcuate fillet is axially thicker at the radially outer edge than the inner edge.

Figure 6:
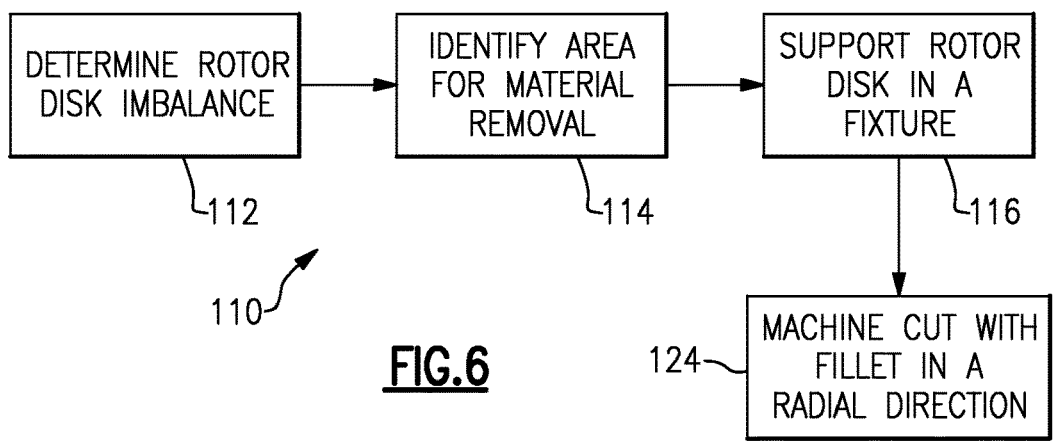
FIG. 6 is a flow chart depicting a method of balancing the rotor disk.

A method 110 of balancing a gas turbine engine disk rotor is depicted in FIG. 6. The method 110 includes a step of determining an imbalance of a rotor disk, as indicated at block 112. An area of the annular ridge is identified for material removal to balance the rotor disk. The rotor disk is supported on a fixture 118, schematically illustrated in FIG. 7. A machine 120 includes a cutting tool 122, such as a ball nose end mill, which is brought in at a right or an oblique angle relative to the radial direction R. The balancing cut 98 is machined into the annular ridge 90 using the cutting tool 122 to balance the rotor disk 60 about the axis X, as indicated at block 124 of FIG. 6. The machining step includes articulating the cutting tool 122 along an arcuate path A (FIG. 7) toward the spacer 76 to provide the fillet 98 in the radial direction R.

Providing a fillet in the radial direction as opposed to a straight cut reduces the stresses in the web during acceleration and deceleration of the rotor disk during engine operation thereby increasing the cycle life of the rotor disk 60.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine rotor disk comprising:
   a web that extends inward in a radial direction from a rim to a bore that circumscribes an axis;
   an annular ridge extends axially from side of the web; and
   a balancing cut in the annular ridge that includes a fillet extending in the radial direction, wherein the balancing cut has spaced apart lateral fillets provided in a circumferential direction, and wherein the side has a generally planar surface, the fillet in the radial direction has spaced apart first and second axial heights relative to the generally planar surface at radial extremities of the balancing cut, the second axial height is arranged at a greater axial distance from the axis than the first axial height, the second axial height greater than the first axial height.

2. A gas turbine engine rotor disk comprising:
   a web that extends inward in a radial direction from a rim to a bore that circumscribes an axis;
   an annular ridge extends axially from side of the web; and
   a balancing cut in the annular ridge that includes a fillet extending in the radial direction, wherein the balancing cut has spaced apart lateral fillets provided in a circumferential direction, and, wherein the fillet has a radius of at least ten times the first axial height.

3. The rotor disk according to claim 2, wherein radius is between fifteen and thirty times the first axial height.

* * * * *